US011921858B2

(12) United States Patent
Samuel et al.

(10) Patent No.: US 11,921,858 B2
(45) Date of Patent: Mar. 5, 2024

(54) SYSTEM AND METHOD FOR PROTECTING AGAINST ALTERATIONS IN CHAIN OF TRUST SEQUENCES

(71) Applicant: Dell Products L.P., Round Rock, TX (US)

(72) Inventors: Balasingh P. Samuel, Round Rock, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 416 days.

(21) Appl. No.: 17/341,567

(22) Filed: Jun. 8, 2021

(65) Prior Publication Data

US 2022/0391511 A1 Dec. 8, 2022

(51) Int. Cl.
*G06F 21/57* (2013.01)
*H04L 9/32* (2006.01)

(52) U.S. Cl.
CPC .......... *G06F 21/575* (2013.01); *H04L 9/3236* (2013.01); *H04L 9/3265* (2013.01)

(58) Field of Classification Search
CPC .... G06F 21/575; H04L 9/3236; H04L 9/3265
See application file for complete search history.

(56) References Cited

U.S. PATENT DOCUMENTS

| 2018/0089436 | A1* | 3/2018 | Smith | H04L 9/3236 |
| 2019/0363894 | A1* | 11/2019 | Kumar Ujjwal | H04L 9/3268 |
| 2019/0377583 | A1* | 12/2019 | Kumar | G06F 21/575 |
| 2020/0272739 | A1* | 8/2020 | Shivanna | H04L 9/3234 |
| 2020/0344265 | A1* | 10/2020 | Kelly | G06F 21/57 |
| 2021/0103661 | A1* | 4/2021 | Wu | G06F 9/445 |
| 2021/0255872 | A1* | 8/2021 | Samuel | G06F 21/572 |
| 2021/0390186 | A1* | 12/2021 | Smith | G06F 9/45558 |

* cited by examiner

*Primary Examiner* — Nimesh G Patel
(74) *Attorney, Agent, or Firm* — McDermott Will & Emery LLP

(57) ABSTRACT

A system for protecting an information handling system from alterations in chain sequencing uses a root of trust to secure transition points between entities in a sequence according to a chain of trust stored in a chain of trust database. Before transitioning control from a first entity transferring control to a second entity receiving control, the root of trust validates the transferring entity and the receiving entity. Failure to validate both entities results in the root of trust stopping the boot process to prevent malicious code from interfering with the BIOS executing the correct steps in the process.

18 Claims, 4 Drawing Sheets

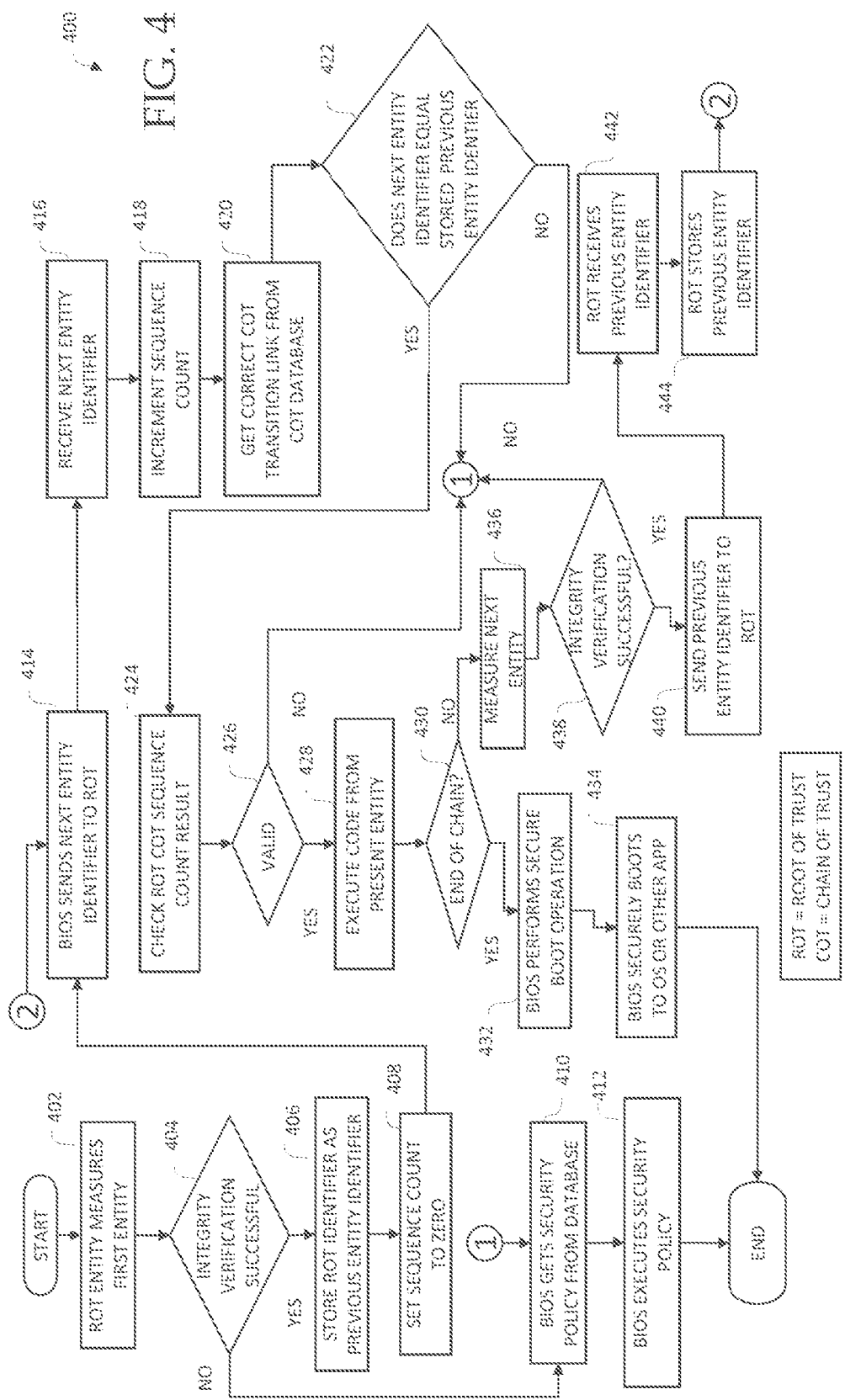

SYSTEM AND METHOD FOR PROTECTING AGAINST ALTERATIONS IN CHAIN OF TRUST SEQUENCES

BACKGROUND

Field of the Disclosure

This disclosure relates generally to information handling systems and, more particularly, to systems for protecting against unwanted alterations in chain of trust sequences.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may execute various boot sequences. For example, an information handling system may execute a boot sequence to boot to a host operating system (OS), execute a boot sequence to boot to a service OS, execute a boot sequence to boot to a diagnostics configuration or execute a boot sequence to boot to a setup configuration.

SUMMARY

A root of trust is a trust anchor for a platform and provides a foundation for security on an information handling system. Typically, a root of trust is hardware-based, thus immutable, and is the first entity to run in a chain of trust implementation.

Embodiments disclosed herein may be generally directed to information handling systems and systems that ensure the information handling system follows a predetermined chain of trust sequence.

BRIEF DESCRIPTION OF THE DRAWINGS

For a more complete understanding of the invention and its features and advantages, reference is now made to the following description, taken in conjunction with the accompanying drawings, in which:

FIG. 4 is a flowgraph depicting how trusted boot signatures are generated and how a trust factor is established by three factor signing.

DESCRIPTION OF PARTICULAR EMBODIMENT(S)

Figure 1:
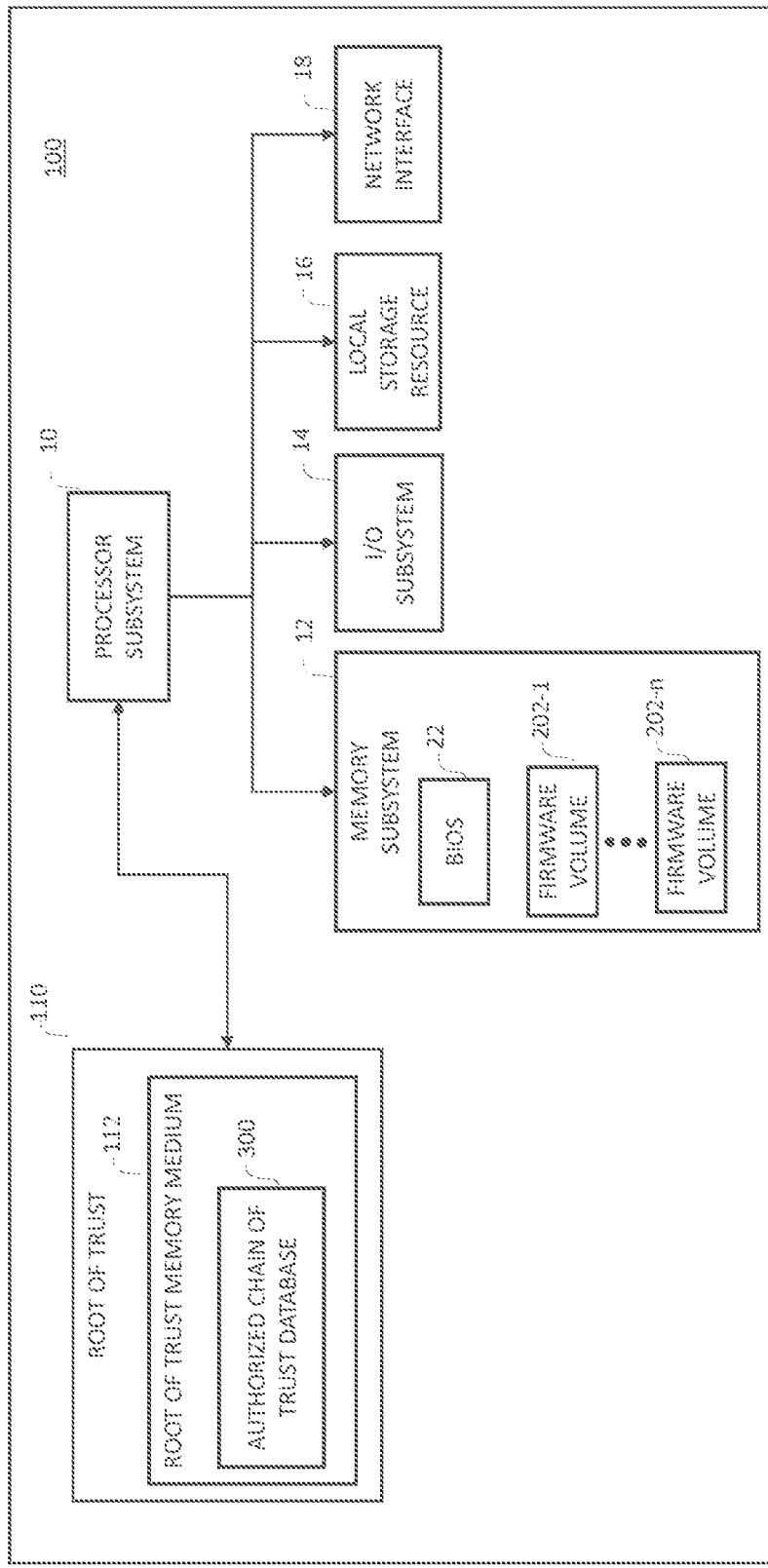
FIG. 1 is a block diagram of selected elements of an embodiment of an information handling system.
Figure 2:
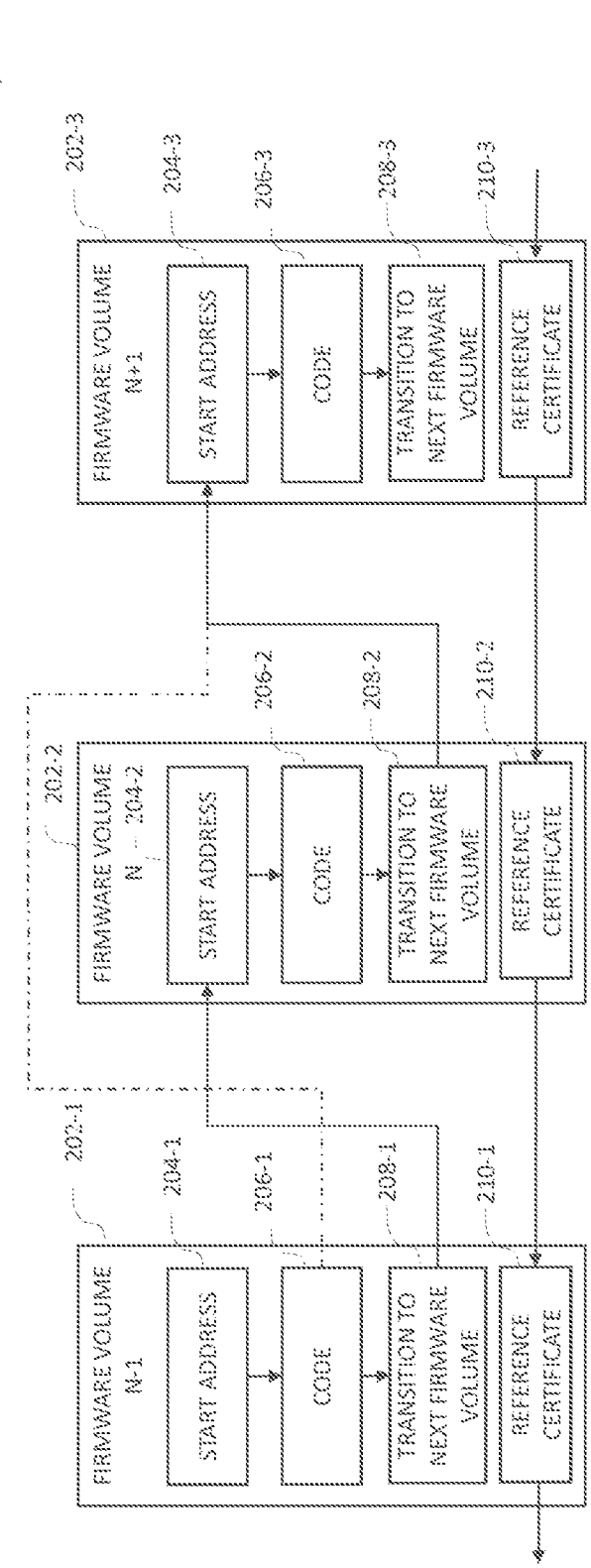
FIG. 2 is a block diagram of firmware volumes in which a firmware volume is not called according to a legitimate boot sequence.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, entity "306-1" refers to an instance of an entity, which may be referred to collectively as entities "306" and any one of which may be referred to generically as entity "306."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

An attack against a BIOS is typically hard to detect and difficult to remove because malicious code is persistent and is executed below the operating system (OS) level such that it can run before any security software loads. Embodiments disclosed herein include an information handling system with a system capable of protecting the chain of trust from alterations in chain sequencing using an interlock mechanism.

Interlock System—Overview

Embodiments implement an interlock system between all entities that make up the members in a sequence of a boot process. All the entities within the sequence authenticate the transition process between the entities to make sure the entity that transfers control (the transferring entity) is legitimate. In addition, a root of trust for the platform validates the order of entities in the sequence of a boot process against a predefined chain of trust order to harden the proper sequence against attacks. The root of trust is used as a gatekeeper whenever a previous entity in a sequence needs to transfer control to a next entity in the sequence. Since the root of trust is trusted for the entire platform, it is entrusted to act as the gatekeeper.

Particular embodiments are best understood by reference to FIGS. 1-5, wherein like numbers are used to indicate like and corresponding parts.

Turning to the drawings, FIG. 1 illustrates a block diagram depicting selected elements of an embodiment of information handling system 100. It is noted that FIG. 1 is not drawn to scale but is a schematic illustration.

As shown in FIG. 1, components of information handling system 100 may include, but are not limited to, a processor subsystem 10, which may comprise one or more processors, communicatively coupled to various system components including, for example, memory subsystem 12, I/O subsystem 14, local storage resource 16, and network interface 18.

Processor subsystem 10 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 10 may interpret and execute program instructions and process data stored locally (e.g., in memory subsystem 12). In the same or alternative embodiments, processor subsystem 10 may interpret and execute program instructions and process data stored remotely (e.g., in a network storage resource).

Processor subsystem 10 may be communicatively coupled to memory subsystem 12, I/O subsystem 14, local storage resource 16, and network interface 18 using a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 12 may comprise a system, device, or apparatus operable to retain and retrieve program instructions and data for a period of time (e.g., computer-readable media). Memory subsystem 12 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 14 may comprise a system, device, or apparatus generally operable to receive and transmit data to or from or within information handling system 100. I/O subsystem 14 may represent, for example, a variety of communication interfaces, graphics interfaces, video interfaces, user input interfaces, and peripheral interfaces. In various embodiments, I/O subsystem 14 may be used to support various peripheral devices, such as a touch panel, a display adapter, a keyboard, a touch pad, or a camera, among other examples. In some implementations, I/O subsystem 14 may support so-called 'plug and play' connectivity to external devices, in which the external devices may be added or removed while information handling system 100 is operating.

Local storage resource 16 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 18 may be a suitable system, apparatus, or device operable to serve as an interface between information handling system 100 and a network (not shown). Network interface 18 may enable information handling system 100 to communicate over a network using a suitable transmission protocol or standard. In some embodiments, network interface 18 may be communicatively coupled via a network to a network storage resource (not shown). A network coupled to network interface 18 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 18 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 18 or various components associated therewith may be implemented using hardware, software, or any combination thereof.

When information handling system 100 is powered on, BIOS 22 may execute instructions to boot information handling system. Booting information handling system 100 may require BIOS 22 to access multiple firmware volumes 202 in a sequence, with each firmware volume 202 having code necessary to complete the boot process.

A root of trust is the trust anchor for a platform and provides a foundation for security on information handling system 100. A root of trust is hardware-based, thus immutable. A root of trust is the first entity to run in a chain of trust implementation. A chain of trust is typically maintained by starting from a hardware entity such as an Embedded Controller (EC) and transitioning control through firmware volumes according to a sequence for a boot process (also referred to as chaining) to the point of booting the operating system.

Client and server information handling systems use a root of trust and one approach to a chain of trust to harden the pre-boot firmware based on the NIST-800 standard. This approach is a typical security solution when adding security and protection against various attacks on the firmware components. For example, referring to FIG. 2, in some approaches, a common chain of trust mechanism works as follows:

BIOS 22 may start at a first start address 204-1 of a first firmware volume 202-1. BIOS 22 may read and execute first code 206-1 before reaching an instruction 208-1 to transition to second firmware volume 202-2.

When the transition is to occur, first firmware volume 202-1 (also referred to as the transferring end or N−1) measures second firmware volume 202-2 (also referred to as the receiving end or N) and generates a digest of next firmware volume 202 to which BIOS 22 will transition. The measurement may include a hash (e.g., SHA256) of second firmware volume 202-2.

The generated digest is verified against a reference digest residing in first firmware volume 202-1. In some embodiments, reference certificate 210-1 is created by measuring the full firmware volume 202-2. The digest may be included in reference certificate 210-1 residing in first firmware volume 202-1. The digest is typically provisioned and securely stored in first firmware volume 202-1 during BIOS build time.

If the generated digest matches the reference digest, BIOS 22 transitions to second firmware volume 202-2, reads and executes code 206-2 until instruction 208-1 to transition to third firmware volume 202-3. BIOS 22 continues through the sequence with each firmware volume 202 measuring the next firmware volume 202 before BIOS 22 transitions control (N, N+1, N+2 . . . firmware volumes). Solid lines represent expected transition links between firmware volumes 202.

However, there is no mechanism available to verify the trust chain validity by the receiving firmware volume 202 (the nth entity). The receiving firmware volume 202 will blindly trust whatever transferring firmware volume 202 gave it control. The assumption is that the previous firmware volume 202 is always trusted and would not have been loaded if the verification of that previous firmware volume 202 had failed. Using this approach, there is potential for malicious code to be injected (for example, due to buffer overrun error) in one of the firmware volumes 202 during runtime. The malicious code could cause BIOS 22 executing code from a first firmware volume (e.g. firmware volume 202-1) to skip a firmware volume (e.g. firmware volume 202-2) and transition to another firmware volume (e.g. firmware volume 202-3) which might or might not be in the chain of trust. For example, referring to FIG. 2, code 206-1 in first firmware volume 202-1 may include a pointer to start address 204-3 in firmware volume 202-3 (depicted as a dashed line) such that firmware volume 202-1 does not transition to second entity 202-2.

Skipping a firmware volume 202 breaks the chain of trust, but current information handling systems may still allow the operation to run. For example, a firmware volume 202 with code 206 that that checks an administrator password could be bypassed by directly calling the next firmware volume in the chain of trust. The UEFI pre-boot code is particularly susceptible to this type of vulnerability and security exposure since the specification allows running firmware volumes from a hard drive or other temporary storage. Skipping a firmware volume 202 could potentially prevent running critical authentication code 206 in the pre-boot phase, for example, a physical presence check or chassis intrusion check.

Embodiments disclosed herein implement an interlock system between entities in a sequence to maintain a chain of trust.

Method for Secure Transitioning Between Firmware Volumes in a Chain of Trust Sequence Communications and transactions between root of trust 110 and firmware volumes 202 may be encrypted. In some embodiments, root of trust 110 comprises an embedded controller (EC) and communication and transactions between the EC and firmware volumes 202 occur over an Authenticated EC Interface (AEI).

Figure 3:
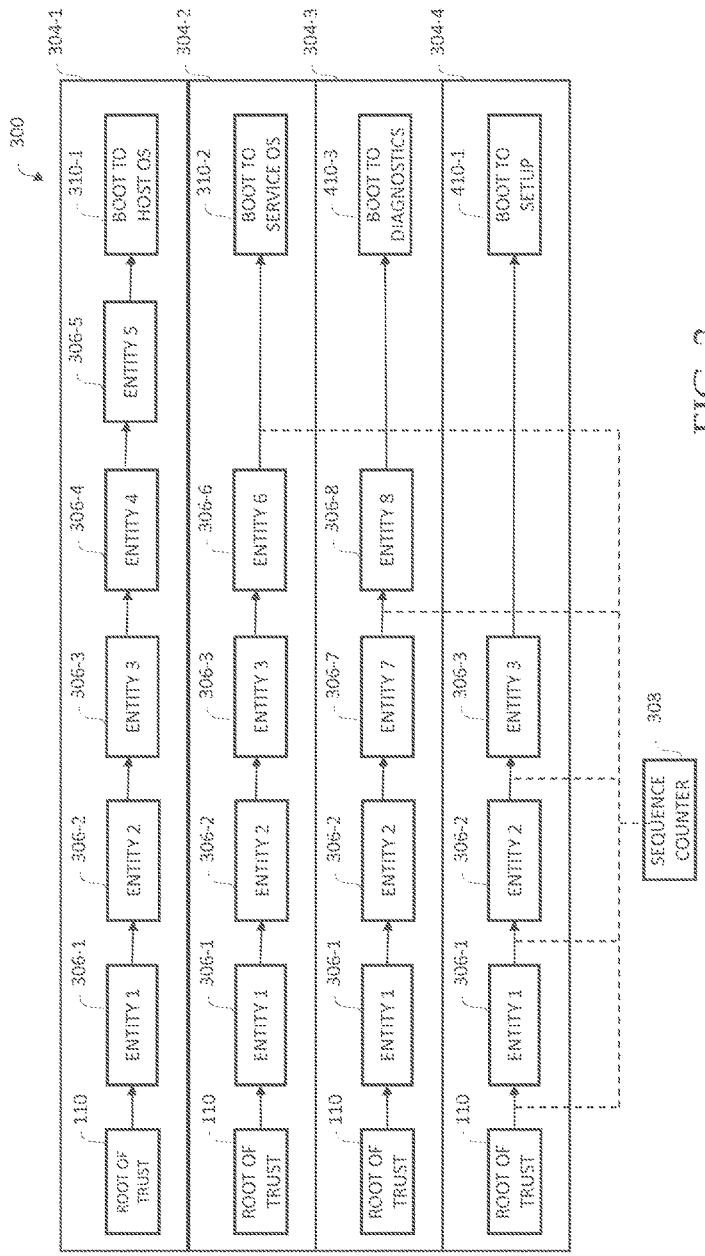
FIG. 3 is a block diagram of one embodiment of an authorized chain of trust database storing authorized chains of trust for different processes.

Referring to FIG. 3, when information handling system 100 is manufactured, an authorized chain of trust database 300 may be pre-provisioned and stored in root of trust memory 112.

Each entity 306 in chain of trust database 300 has a unique entity identifier. In some embodiments, each entity 306 in chain of trust database 300 has a globally unique identifier (GUID). A GUID is static once defined and will not change for a given firmware volume functionality, such that the GUID for each firmware volume 202 follows the high-level functionality of the firmware volume 202 rather than a version or details for a change to the firmware volume 202.

Chain of trust database 300 may include a plurality of authorized chains of trust 304, wherein each chain of trust 304 comprises a set of entities 306 in a sequence originating from the root of trust 110 and resulting in a boot process 310. At BIOS build time, all of the authorized chains of trust 304 are compiled as static table structures. In some embodiments, root of trust 110 may be an embedded controller (EC) and all of the authorized chains of trust 304 are compiled in an EC image.

A first chain of trust 304-1 may comprise a first set of entities 306 in a first sequence originating at root of trust 110, wherein transitioning control from root of trust 110 through first entity 306-1, second entity 306-2, third entity 306-3, fourth entity 306-4 and fifth entity 306-5 results in information handling system 100 booting to Host OS process 310-1.

A second chain of trust 304-2 may comprise a first set of entities 306 in a second sequence originating at root of trust 110, wherein transitioning control from root of trust 110 through first entity 306-1, second entity 306-2, third entity 306-3 and sixth entity 306-6 results in information handling system 100 booting to Service OS process 310-2.

A third chain of trust 304-3 may comprise a third set of entities 306 in a third sequence originating at root of trust 110, wherein transitioning control from root of trust 110 through first entity 306-1, second entity 306-2, seventh entity 306-7 and eighth entity 306-8 results in information handling system 100 booting to Diagnostics process 310-3.

A fourth chain of trust 304-4 may comprise a fourth set of entities 306 in a fourth sequence originating at root of trust 110, wherein transitioning control from root of trust 110 through first entity 306-1, second entity 306-2 and third entity 306-3 results in information handling system 100 booting to Setup process 310-4.

Other chains of trust 304 may be included in chain of trust database 300.

For each transition between a previous entity (e.g., first entity 306-1) and the next entity (e.g., second entity 306-2) in a sequence of a boot process, the entity (e.g., entity 306-2 corresponding to firmware volume 202-2) measures the previous entity (e.g., entity 306-1 corresponding to firmware volume 202-1) by calculating a digest and the root of trust 110 compares the calculated digest with an expected digest stored in the entity (e.g., entity 306-2 corresponding to firmware volume 202-2), which is already validated to be part of the chain of trust (e.g., chain of trust 304-1).

Sequence counter 308 stored in root of trust 110 may be set to 0 each time a boot process is started and incremented at each transition between entities 306.

A method 400 for transitioning between entities in a chain of trust 304 while protecting against alterations in sequencing may begin when BIOS 22 starts a boot process 310. Embodiments may access chain of trust database 300 in root of trust memory medium 112 to determine which chain of trust 304 applies to the boot process 310. For simplicity, steps in a method for transitioning between entities in a chain of trust 304 may be described with respect to chain of trust 304-1.

Steps 402-408, 416-422 and 442-444 may be performed by an embedded controller (EC) or some other service processor responsible for the root of trust 110. Steps 414, 424-440 may be performed by BIOS 22. Steps 410-412 may be executed by either BIOS 22 or a root of trust such as an embedded controller.

At step 402, root of trust 110 measures a first entity 306-1 in chain of trust 304-1. In some embodiments, root of trust 110 may calculate a hash for first entity 306-1.

At step 404, root of trust 110 determines if an integrity verification of first entity 306-1 is successful.

If the integrity verification is not successful, the boot processes is stopped. In some embodiments, at step 410, BIOS 22 may get a security policy, execute the security policy at step 412 and end the boot process. In some embodiments, root of trust entity such as an embedded controller (EC) can halt execution based on a platform security policy.

If the integrity verification is successful, then at step 406, root of trust 110 may store a root of trust identifier as a previous entity identifier. A root of trust identifier may be a globally unique identifier (GUID), which may be generated by information handling system 100.

At step 408, root of trust 110 sets a sequence count to zero and sends a signal to BIOS 22. BIOS 22 may receive the signal to transition control from root of trust 110 to first entity 306-1 for the boot process 310.

When BIOS 22 starts to transition control from root of trust 110 to first entity 306-1, the transition may be controlled by root of trust 110.

Beginning at step 414, BIOS 22 sends a next entity identifier securely to root of trust 110. For example, when BIOS 22 starts transitioning control from root of trust 110 to first entity 306-1, BIOS 22 may send a GUID over Authenticated EC Interface (AEI) for first entity 306-1 to an embedded controller (EC) functioning as root of trust 110 using Authenticated EC Interface (AEI).

At step 416, root of trust 110 receives the next entity identifier. When BIOS 22 transitions control from root of trust 110 to first entity 306-1, the next entity identifier may be an entity identifier for first entity 306-1.

At step 418, root of trust 110 increments the sequence count. Initially, when BIOS 22 transitions control from root of trust 110 to first entity 306-1, root of trust 110 may increment the sequence count from 0 to 1.

At step 420, root of trust 110 gets the correct chain of trust transaction link from pre-authorized chain of trust database 300. Embodiments may use the sequence count to get a reference transaction link. Thus, before BIOS 22 transitions from root of trust 110 to first entity 306-1, root of trust 110 may determine the correct transaction link corresponds to root of trust 110 as the previous entity and first entity 306-1 as the next entity.

At step 422, root of trust 110 compares the next entity identifier received from BIOS 22 with a next entity identifier stored in root of trust memory medium 112 and determines if the next entity identifier received from BIOS 22 equals the next entity identifier stored in root of trust memory medium 112. For example, before BIOS 22 transitions control from root of trust 110 to first entity 306-1, root of trust 110 may determine if the next entity identifier received from BIOS 22 equals an entity identifier for first entity 306-1 stored in root of trust memory medium 112.

If root of trust 110 determines the next entity identifier received from BIOS 22 does not match the next entity identifier stored in root of trust memory medium 112, then root of trust 110 does not transition control to the next entity 306. At step 410, BIOS 22 may get a security policy from a database in memory subsystem 16, execute the security policy at step 412 and end the boot process. Thus, if root of trust 110 expects BIOS 22 to transition control from root of trust 110 to first entity 306-1 but determines the next entity identifier received from BIOS 22 does not equal the entity identifier for first entity 306-1 stored in root of trust memory medium 112, root of trust 110 prevents BIOS 22 from transitioning control to a firmware volume 202 corresponding to the next entity identifier received from BIOS 22 and signals BIOS 22 to get a security policy from a database, execute the security policy and end the boot process.

If root of trust 110 determines the next entity identifier received from BIOS 22 matches the next entity identifier stored in root of trust memory medium 112, then at step 424, BIOS 22 may check the sequence count stored in root of trust memory medium 112.

At step 426, BIOS 22 determines if the sequence count for chain of trust 304-1 stored in root of trust memory medium 112 is valid.

If the sequence count for chain of trust 304-1 stored in root of trust memory medium 112 is not valid, then root of trust 110 does not transition control to the next entity. At step 410, BIOS 22 may get a security policy from a database, execute the security policy at step 412 and end the boot process. Alternatively a root of trust entity such as an embedded controller can halt the execution using platform security policy.

If the sequence count for the chain of trust 304 stored in root of trust memory medium 112 is valid, then at step 428, BIOS 22 may transition control to entity 306-1 corresponding to the next entity identifier.

At step 430, BIOS 22 may determine if the sequence has reached the last entity 306 (e.g., entity 306-5 for chain of trust 304-1) in a sequence corresponding to the chain of trust 304 or if there are remaining entities 306 in the sequence.

If the last entity 306 in a sequence corresponding to a chain of trust 304 (e.g. entity 306-5 of chain of trust 304-1) has been reached, then at step 432, BIOS 22 may complete a secure boot operation and securely boot to the OS or other application at step 434.

If BIOS 22 determines there are more entities 306 in a sequence corresponding to a chain of trust 304, BIOS 22 may measure the next entity (e.g. entity 306-2) at step 436.

At step 438, BIOS 22 verifies integrity of the next entity (e.g. entity 306-2).

If the integrity verification is not successful, then root of trust 110 does not transition control to the next entity (e.g., entity 306-2). At step 410, BIOS 22 may get a security policy, execute the security policy at step 412 and end the boot process.

If the integrity verification is successful, then at step 440, BIOS 22 sends a previous entity identifier to root of trust 110. For example, once root of trust 110 transitions control to first entity 306-1, first entity 306-1 becomes the previous entity and an entity identifier for first entity 306-1 becomes the previous entity identifier.

At step 442, root of trust 110 receives the previous entity identifier from BIOS 22.

At step 444, root of trust 110 stores the previous entity identifier received from BIOS 22.

Steps 414-444 may be repeated each time BIOS 22 transitions between root of trust 110 and first entity 306-1 and between any two entities 306.

Thus, to prevent alterations in chain sequences, a system may be configured such that, before an entity 306 (e.g. entity 306-2) in a sequence receives control from another entity 306 (e.g. entity 306-1), the entity 306 (e.g. entity 306-2) sends its entity identifier (e.g., its GUID) to the root of trust 110 and waits for the root of trust 110 to verify that the entity 306 (e.g. entity 306-2) is the correct next entity 306 in the chain of trust 304 before proceeding.

Based on the response from root of trust 110, an entity 306 will either proceed or take steps to log the event and/or execute one or more policies based on the type of boot flow that was affected. For example, embodiments may only log the event, may shut down information handling system 100 for a period, may lock information handling system 100 and require an administrator password.

When the root of trust 110 receives an entity identifier from an entity 306, root of trust 110 verifies it is legitimate, then recalls the previous entity identifier and checks in the authorized chain of trust database 300 to see if the current sequencing of the two entities 306 is correct. If the sequencing of the two entities 306 is correct, root of trust 110 will inform the second entity that it can proceed.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for protecting against alterations in chain sequencing in an information handling system, the information handling system comprising a BIOS memory medium storing a set of BIOS instructions executable to process code in a firmware volume, wherein the firmware volume comprises a start address, code forming part of a boot process and a pointer to a next firmware volume, the method comprising:
   storing, in a root of trust memory medium of the information handling system, a chain of trust database comprising a set of chains of trust, wherein each chain of trust specifies a plurality of entities in a sequence originating from the root of trust;
   determining a chain of trust for a boot process;
   validating, by the root of trust, the sequence of the plurality of entities for the boot process; and
   transitioning, by the root of trust, control from a previous entity to a next entity in the sequence,
   wherein the validating and the transitioning comprises:
      verifying a first entity in the selected chain of trust;
      storing a root of trust identifier as a previous entity identifier;
      setting a sequence count to zero;
      sending a next entity identifier to the root of trust;
      incrementing the sequence count;
      receiving a next entity identifier;
      retrieving, based on the sequence count and the selected chain of trust, a correct transition link between the previous entity and the next entity;
      comparing the received next entity identifier with the stored previous entity identifier based on the sequence count;
      notifying the BIOS if the received next entity identifier matches the stored previous entity identifier; and
      determining if the sequence count in the root of trust is valid.

2. The method of claim 1, one or more of the root of trust identifier, the previous entity identifier and the next entity identifier comprises a Globally Unique Identifier (GUID).

3. The method of claim 2, wherein the GUID is generated by the root of trust.

4. The method of claim 1, wherein verifying the first entity comprises measuring the first entity.

5. The method of claim 4, wherein measuring the first entity comprises calculating a hash for the first entity.

6. The method of claim 1, wherein the root of trust comprises an embedded controller (EC), wherein communication between the first entity and the EC is over an Authenticated EC Interface (AEI).

7. A method for protecting against alterations in chain sequencing in an information handling system, the information handling system comprising a BIOS memory medium storing a set of BIOS instructions executable to transition control between entities in a sequence, the method comprising:
   storing, in a memory medium in a root of trust for the information handling system, a chain of trust database comprising a set of chains of trust, wherein each chain of trust specifies a plurality of entities in a sequence originating from the root of trust;
   in response to an instruction to start a boot process of a plurality of boot processes:
      1) selecting, by the root of trust, a chain of trust from the chain of trust database corresponding to the boot process;
      2) verifying, by the root of trust, a first entity in the selected chain of trust;
      3) storing, in the root of trust memory medium, a root of trust identifier as a previous entity identifier;
      4) setting, by the root of trust, a sequence count to zero;
      5) sending, by the BIOS, a next entity identifier to the root of trust;
      6) receiving, by the root of trust, the next entity identifier;
      7) incrementing, by the root of trust, the sequence count;
      8) retrieving, from the root of trust memory medium, by the root of trust, based on the sequence count and the selected chain of trust, a correct transition link between the previous entity identifier and the next entity identifier;
      9) comparing, by the root of trust, the received next entity identifier with the stored next entity identifier based on the sequence count;
      10) notifying, by the root of trust, the BIOS if the received next entity identifier matches the stored next entity identifier;
      11) Determining, by the BIOS, if the sequence count received from the root of trust is valid;
      12) Transitioning control to an entity corresponding to the received next entity identifier; and
      repeating steps 5-12 until the BIOS transitions control to a last entity in the sequence.

8. The method of claim 7, wherein one or more of the root of trust identifier, the previous entity identifier and the next entity identifier comprises a Globally Unique Identifier (GUID).

9. The method of claim 8, wherein the GUID is generated by the root of trust.

10. The method of claim 7, wherein verifying an entity comprises measuring the entity.

11. The method of claim 10, wherein measuring an entity comprises calculating a hash for the entity.

12. The method of claim 7, wherein the root of trust comprises an embedded controller (EC), wherein communication between the entity and the EC is over an Authenticated EC Interface (AEI).

13. A system for protecting against alterations in chain sequencing, the system comprising:
- a BIOS memory medium storing a set of BIOS instructions for transitioning between entities in a sequence; and
- a root of trust memory medium separate from the BIOS memory medium, the root of trust memory medium storing a chain of trust database comprising a plurality of authorized chains of trust and a set of root of trust instructions executable to:
- in response to the information handling system receiving an instruction to start a boot process:
- select a chain of trust from the plurality authorized chains of trust;
- measure a first entity in the selected chain of trust;
- store a root of trust identifier as a previous entity identifier; and
- set a sequence count to zero;
- the set of BIOS instructions are executable to send a first entity identifier as a next entity identifier to the root of trust;

wherein the set of root of trust instructions are executable to:
- receive the next entity identifier;
- increment the sequence count;
- retrieve, based on a chain of trust in the chain of trust database, a correct transition link between the previous entity identifier and the next entity identifier;
- compare the next entity identifier with a stored previous entity identifier based on the sequence count; and
- notify the BIOS if the next entity identifier matches the stored entity identity;

wherein the BIOS comprises instructions executable to:
- determine if the sequence count for the chain of trust is valid; and
- transition control to the next entity in the chain of trust.

14. The system of claim 13, wherein one or more of the root of trust identifier, the previous entity identifier and the next entity identifier comprises a Globally Unique Identifier (GUID).

15. The system of claim 14, wherein the GUID is generated by the root of trust.

16. The system of claim 15, wherein the root of trust is configured to measure the entity.

17. The system of claim 16, wherein the root of trust is configured to calculate a hash for the entity.

18. The system of claim 13, wherein the root of trust comprises an embedded controller (EC), wherein communication between the entity and the EC is over an Authenticated EC Interface (AEI).

* * * * *